C. A. LUMIÈRE.
KINETOGRAPHIC APPARATUS.
APPLICATION FILED MAY 25, 1907.
922,302.
Patented May 18, 1909.
3 SHEETS—SHEET 1.
Fig. 1ª.
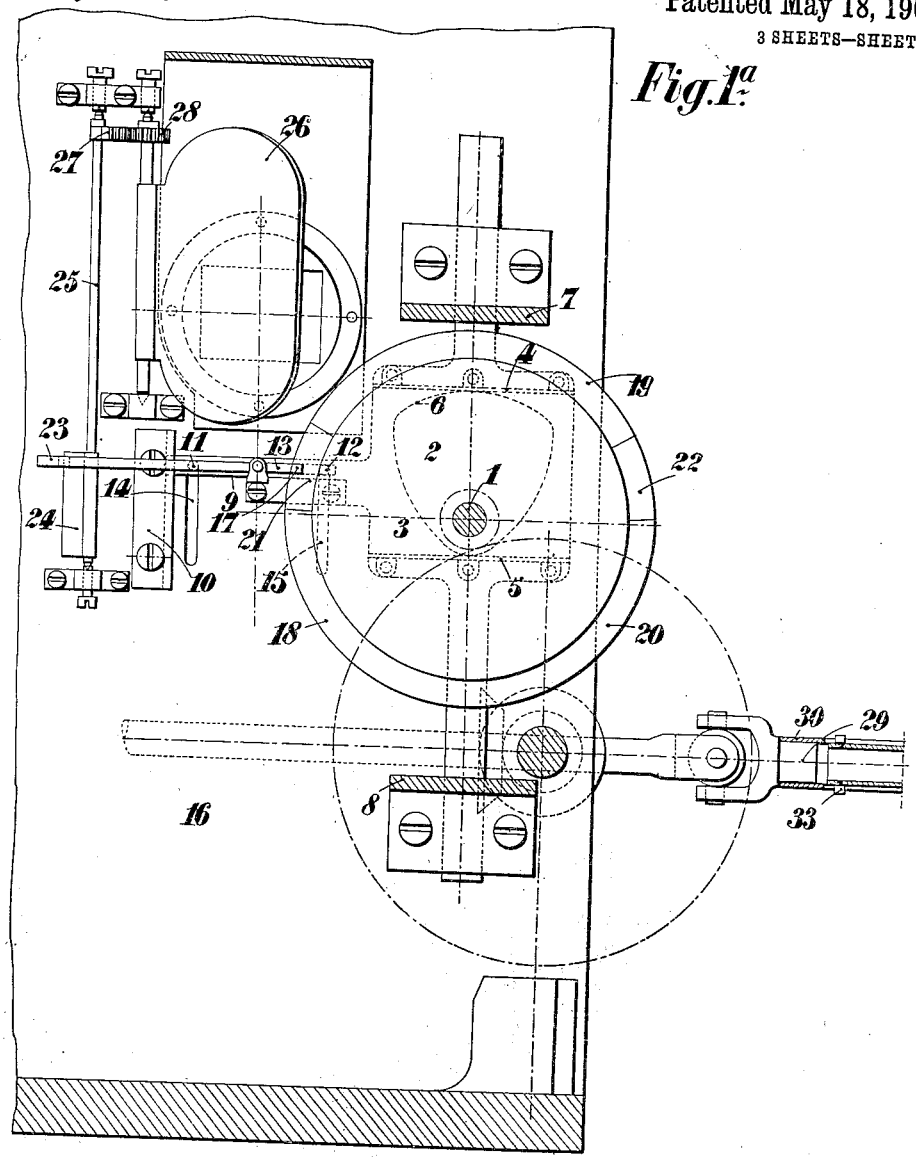
Fig. 2.
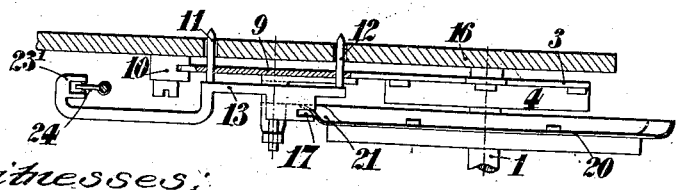
Witnesses:
Inventor
Claude A. Lumière
By
James L. Norris

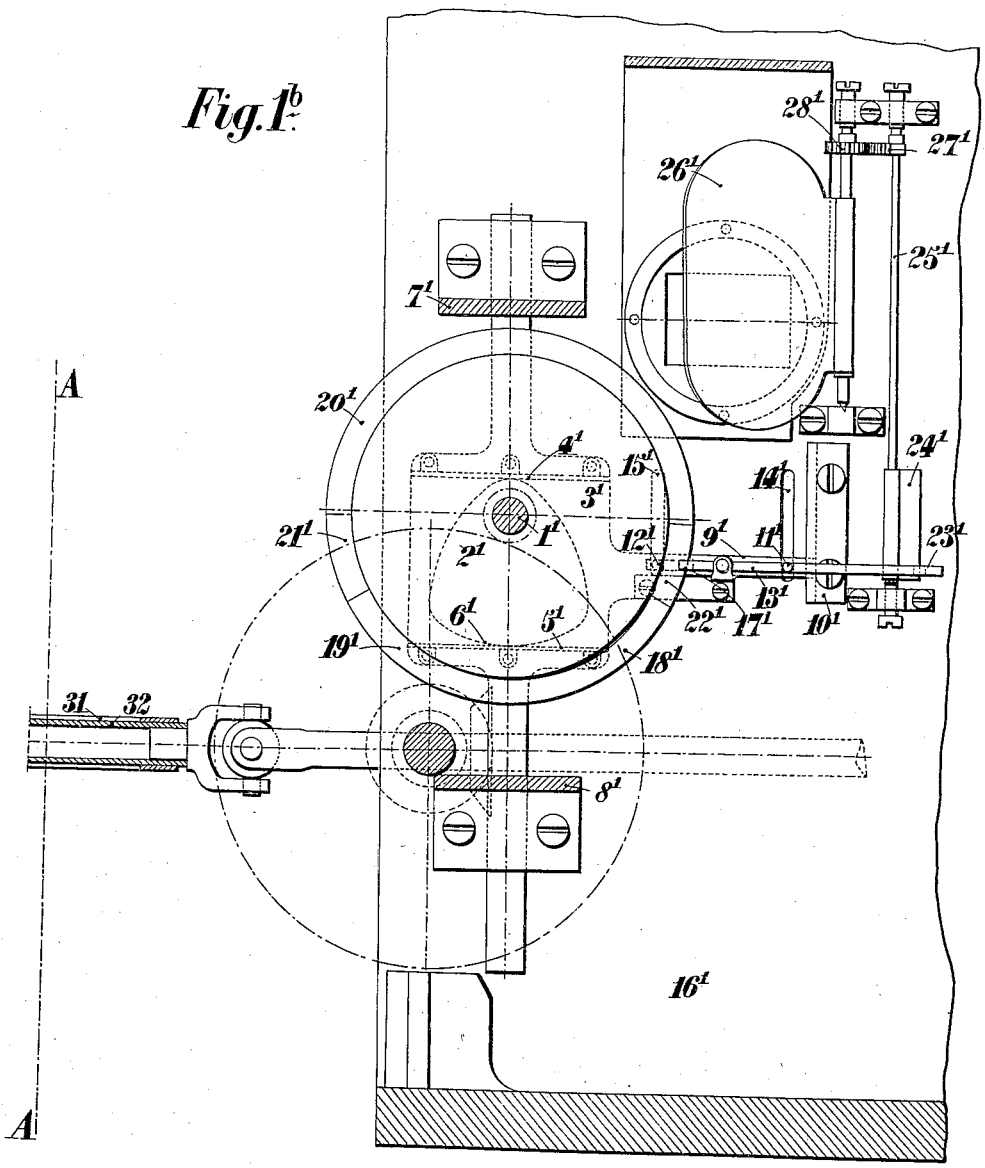

C. A. LUMIÈRE.
KINETOGRAPHIC APPARATUS.
APPLICATION FILED MAY 25, 1907.
922,302.
Patented May 18, 1909.
3 SHEETS—SHEET 3.
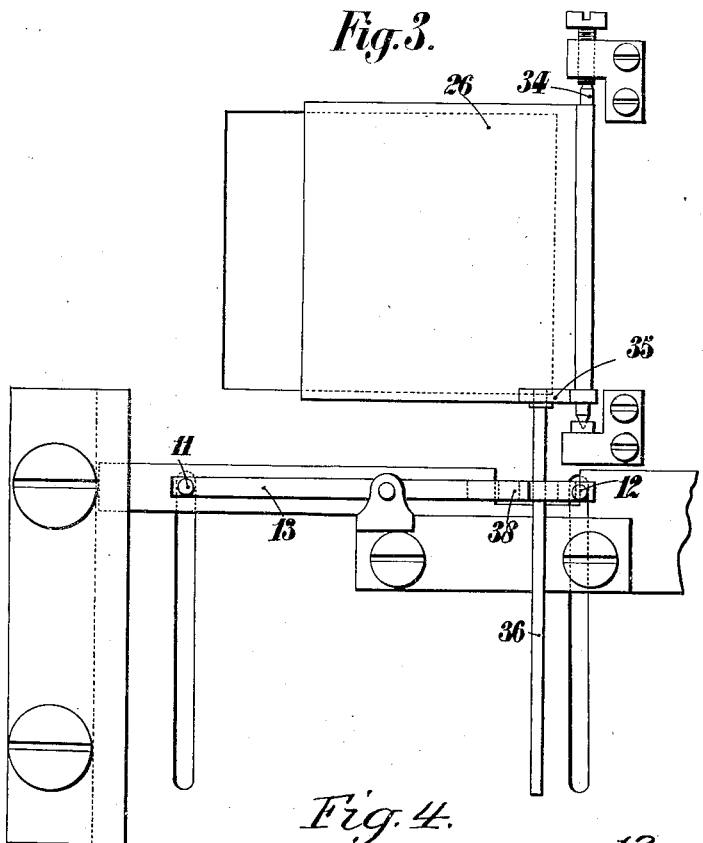
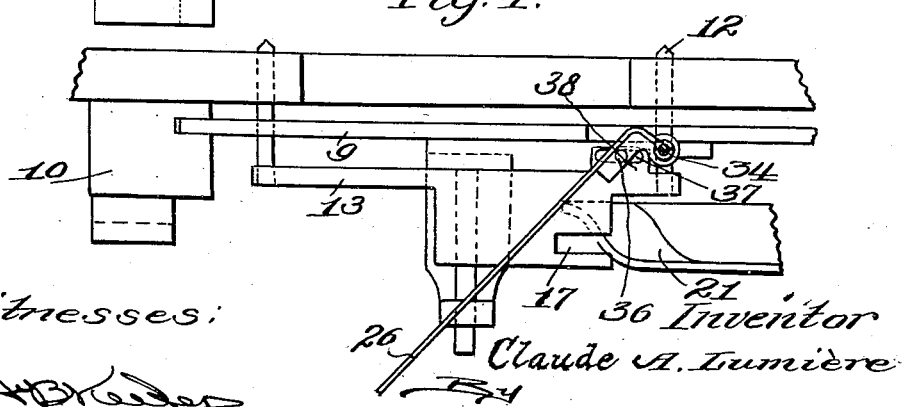

UNITED STATES PATENT OFFICE.

CLAUDE ANTOINE LUMIÈRE, OF PARIS, FRANCE.

KINETOGRAPHIC APPARATUS.

No. 922,302.  Specification of Letters Patent.  Patented May 18, 1909.

Application filed May 25, 1907. Serial No. 375,696.

*To all whom it may concern:*

Be it known that I, CLAUDE ANTOINE LUMIÈRE, citizen of the French Republic, residing at Paris, France, Department of the Seine, have invented certain new and useful Improvements in Kinetographic Apparatus, of which the following is a specification.

The present invention has for its object to provide improved apparatus for the photography and the projection of animated pictures.

In the ordinary kinematographic processes, a series of successive views is projected, these views having been taken at very close intervals and arranged upon a strip of film; an unwinding apparatus, the movements of which correspond to that of the shutter, brings each of the pictures in front of the objective. The projection of each partial view comprises several phases: 1. The opening of the shutter. 2. The exposure. 3. The closing of the shutter. 4. The displacement of the film by the length of a picture in order to bring the following picture in front of the objective. The third and fourth phases give rise to a period during which the screen is not illuminated. The continuous succession of these phases tires the sight, and to a large extent produces the impression of jerks and vibrations which is given by the kinematograph.

The present invention has for its object to eliminate the obscure periods in kinematographic projections and to insure the constant and invariably equal illumination of the screen. At the same time it permits of doubling the number of pictures projected during a given period. In this manner, the movements obtained are much smoother;
finally the constant illumination of the projection surface prevents the eyes from becoming tired. The means employed for obtaining these results consists in arranging the successive pictures not upon a single film but upon two films unwinding parallelly, the image, which is always projected at the same place, being taken from one or other of these films alternately. To this end a double projection apparatus is employed. One of the films unwinds in front of each of the two projectors, its movements being regulated in such a manner that one is displaced by the length of a picture while the other is in its projection period.
In order to insure the continuous illumination of the screen, the opening and the closing of the two shutters are combined in such a manner that when one of the two shutters is beginning to mask its objective, the other shutter begins to uncover its objective; the movements are regulated in such a way that the masked area of one objective is always equal to the exposed area of the other. The projection screen thus receives a constant quantity of light, that is to say that which corresponds to the full aperture of one objective. During a very short period, the picture projected is composed of variable elements of two successive images illuminated through a portion of their respective objectives, but by reason of the rapidity of the shutters the connection between the two partial images is hardly perceptible, and the two successive images, taken at intervals of time as close again together as in the ordinary processes, present very slight differences. The negatives of the pictures are similarly taken by means of a double photographic apparatus, the two shutters of which are opened alternately, one of the films being displaced while the other is being exposed. It is not however necessary for this operation to uncover one objective progressively in proportion as the other is masked; it is obvious that this precaution is only useful during the projection. Instead of taking the pictures upon two separate films, they may be taken upon one wide film, the images produced by the two objectives being then arranged in alternate manner on the two sides of this band.

The following description refers by way of example only, to kinematographs of the Lumière type; the invention is however applicable to any other type of kinematograph.

In the accompanying drawings: Figures 1 and 1ª represent two projection apparatus coupled by a universal joint. Fig. 2 is a plan view, partly in section. Figs. 3 and 4 are respectively side elevation and sectional view of a slight modification.

The unwinding of the films is effected as in the ordinary Lumière kinematograph apparatus; the driving shaft 1 carries a triangular or shield-shaped cam 2 communicating a vertical reciprocating movement to a metal frame 3 which rests upon the cam by means of two plane surfaces 4 and 5; one of the parts of the triangular cam 2 is constituted by a circular surface 6 having for its center the driving shaft 1, in such a manner that the said metal frame 3 remains in its two extreme positions for a certain time. This frame 3, immovably connected to two arms sliding in slots 7 and 8, forms one with a plate 9 which is guided in a slot 10. This plate is perforated, and in these perforations, pins 11 and 12, carried by a member or bar 13 engage (Figs. 1 and 2). These pins have thus a reciprocating movement in the vertical direction; they move in slots 14 and 15 formed in one of the walls 16 of the stand, behind which wall the film is arranged, its edges being perforated with a number of holes in which the pins 11 and 12 engage. In order that this may take place, it is necessary to displace the bar 13 which carries the pins horizontally; to this end the said bar is provided with a groove 17 in which the edge of a plate 18 keyed to the driving shaft 1 engages; the edge of the plate comprises two parts 19 and 20 arranged in different vertical planes and connected one with the other by two inclined surfaces 21, 22; these inclined surfaces are arranged relatively to the triangular cam 2 in such a manner as to engage in the groove 17 provided in the bar 13 hereinbefore mentioned at the moment at which the metal frame 3 rests with one of its faces 4 or 5 on the circular part 6 of the triangular cam, and consequently remains at rest. The passage of the inclined surfaces through the last mentioned groove 17 imparts to the bar 13 a horizontal movement in one direction or the other. This bar 13 is therefore given a vertical reciprocating movement with two stoppages at the extremities of its displacements, and at this moment a horizontal movement which brings the pins 11 and 12 attached thereto into the holes formed on the edges of the film, or withdraws them therefrom.

In order that the shutter may be controlled simultaneously, the bar 13 is bent at right angles at one of its extremities, and also forms a sort of jaw 23 in which a fly 24 rotating about a shaft 25 is introduced; the horizontal movements of the bar 13 cause the fly to pivot about its shaft, and thus by means of any suitable mechanism controls the shutter 26; in the form of apparatus described (Figs. 1 and 2) the said shaft 25 carries a toothed sector 27 meshing with a pinion 28 keyed upon the shaft of the shutter 26.

The inclined surfaces 21 22 upon the plate which is keyed to the driving shaft 1 are arranged in such a manner that at the moment at which the exposure begins, the pins 11 and 12 leave the film and the shutter opens; at the end of the exposure the pins seize the film, the shutter is closed and the bar 13 being moved downward carries the film along.

The apparatus which has just been described is coupled with an identical apparatus arranged symmetrically thereto, relatively to the axis A—A; the same parts are designated by the same characters of reference with the index 1. The operation is such that the cam 2¹ upon the driving shaft 1 of the second apparatus always occupies a position diametrically opposite to that of the similar cam 2 in the first apparatus, that is to say the circular part 6¹ of the cam 2¹ begins to act upon the plane surface 5¹ of the frame 3¹ in the second apparatus at the moment at which the surface 6 of the cam 2 in the first apparatus comes into contact with the surface 4 of the frame 3; it follows that the film in the second apparatus is displaced while the film in the first apparatus is exposed, and that the shutter 26¹ is closing while the other 26 is opening.

The two apparatus may be coupled, for example by a universal joint 29 comprising a hollow tube 30 in which two slots 31 are formed. In this tube there slides a cylindrical part 32 provided with two tenons 33 engaged in slots 31 and also limiting the extension of the joint. This universal joint permits of regulating the direction of the objectives of the two apparatus, which project their pictures exactly at the same place.

Figs. 3 and 4 show on a larger scale, a modified form of device for controlling the shutter 26. This shutter is deplaceable around a shaft 34 and is immovably fixed to an arm 35 upon which a rigid rod 36 is fixed. This rod 36 is displaced by the bar 13 which carries the pins 11 and 12, in the horizontal direction, a groove 37 formed in a boss 38 on the said bar 13 enabling the rigid rod 36 to follow this movement. This latter rod is prolonged as far as the lower extremity of the grooves 14 in which the pins move, in such a manner as to remain in the groove 37 until the end of the travel of the bar 13 so that it is always controlled by this part.

Any suitable mechanism may be employed for exposing the films preparatory for use for projection purposes, it being usual to employ twin objectives, the light being controlled by shutters having exposure apertures arranged in diametrically opposite relation to enable the objectives to take the pictures alternately.

Having thus described and ascertained the nature of my invention and in what manner the same may be performed, I declare that what I claim is:

1. A projection apparatus comprising a pair of projectors, exposure controlling shutters for the respective projectors, and a controlling connection between the shutters including a universal joint that permits relative angular adjustment of the optical axes of the projectors.

2. A projection apparatus comprising a pair of view projecting devices embodying film engaging mechanisms, shutters for the respective devices, and an operative connection between the shutters and film advancing mechanisms of the respective devices and permitting relative angular adjustment of the projecting devices.

3. A projection apparatus comprising a pair of projecting devices, film operating mechanism for each projecting device, shutters for the respective films, operating mechanism on each projecting device for actuating its respective film and coöperating shutter, and a universal joint connecting the operating mechanism of the two projectors and permitting relative angular adjustment of the latter.

4. A projection apparatus comprising a pair of independently mounted projecting devices, film operating mechanism thereon, shutters on the respective projecting devices, and means for relatively timing the operation of the shutters including a universal joint which permits relative angular adjustment of the projecting devices.

5. A projection apparatus comprising a pair of projecting devices, film operating mechanism thereon, independent shutters on the respective projecting devices, operating shafts for relatively timing the operations of the shutter and its coöperating film, and means for causing alternate opening and closing of the respective shutters and including a universal joint that permits relative angular adjustment of the projecting devices.

6. Film operating mechanism for apparatus of the character described, comprising a member reciprocal longitudinally of the film, a device for engaging and disengaging said member relatively to the film, and a shutter operable by said member between the periods of longitudinal movement of the latter.

7. Film operating mechanism of the character described, comprising a member mounted to operate longitudinally of the film and having means for engaging and disengaging the latter, a device for moving said member transverse to the plane of the film at intervals between the periods of longitudinal movement thereof to alternately engage and disengage the film, and a shutter operatively connected to and actuated by the said member and timed to open and close during the relative transverse movements of said member.

In testimony whereof I have hereunto set my hand in presence of two subscribing witnesses.

CLAUDE ANTOINE LUMIÈRE.

Witnesses:
Y. TISSEX,
URI FRANCOIS.